US011157062B2

(12) United States Patent
Mitrea et al.

(10) Patent No.: US 11,157,062 B2
(45) Date of Patent: *Oct. 26, 2021

(54) CONFIGURABLE DIGITAL INTERFACE FOR SWITCHING VOLTAGE REGULATORS

(71) Applicant: Infineon Technologies Austria AG, Villach (AT)

(72) Inventors: Cristian Mitrea, San Pedro, CA (US); Herbert Zojer, Torrance, CA (US); Benjamim Tang, Rancho Palos Verdes, CA (US); Renato Bessegato, Oberhaching (DE)

(73) Assignee: Infineon Technologies Austria AG, Villach (AT)

( * ) Notice: Subject to any disclaimer, the term of this patent is extended or adjusted under 35 U.S.C. 154(b) by 209 days.

This patent is subject to a terminal disclaimer.

(21) Appl. No.: 16/029,050

(22) Filed: Jul. 6, 2018

(65) Prior Publication Data

US 2018/0314313 A1 Nov. 1, 2018

Related U.S. Application Data

(63) Continuation of application No. 14/480,777, filed on Sep. 9, 2014, now Pat. No. 10,037,068.

(51) Int. Cl.
*G06F 1/26* (2006.01)
*G06F 1/3234* (2019.01)
(Continued)

(52) U.S. Cl.
CPC .......... *G06F 1/3243* (2013.01); *G06F 1/3293* (2013.01); *G06F 13/38* (2013.01);
(Continued)

(58) Field of Classification Search
CPC ......... G06F 1/26; G06F 1/3243; H02M 3/157
(Continued)

(56) References Cited

U.S. PATENT DOCUMENTS

| 7,266,709 B2 | 9/2007 | Chapuis et al. |
| 7,518,350 B2 | 4/2009 | Leung |

(Continued)

FOREIGN PATENT DOCUMENTS

| CN | 1848634 A | 10/2006 |
| CN | 101416138 A | 4/2009 |

OTHER PUBLICATIONS

Interface (computing), Wikipedia (Jun. 26, 2017), available at https://en.wikipedia.org/w/index.php?title=Interface_(computing)&oldid=787660591.*

*Primary Examiner* — Suresh Suryawanshi
(74) *Attorney, Agent, or Firm* — Murphy, Bilak & Homiller PLLC (57) ABSTRACT

A high-speed, low-latency configurable digital interface for a voltage regulator includes a first hardwired unit, a second hardwired unit and a programmable microcontroller interfaced between the first and second hardwired units. The first hardwired unit is operable to deserialize incoming frames received over the configurable digital interface into commands and data associated with operation of a switching voltage regulator, and serialize outgoing data into new frames for transmission over the configurable digital interface. The second hardwired unit is operable to process the commands included in the incoming frames deserialized by the first hardwired unit, and provide the outgoing data to be serialized into new frames by the first hardwired unit. The programmable microcontroller is operable to change one or more of the commands and data flowing between the first and second hardwired units.

19 Claims, 7 Drawing Sheets

(51) Int. Cl.
*G06F 13/38* (2006.01)
*G06F 1/3293* (2019.01)
*H02M 3/157* (2006.01)
*H02M 3/155* (2006.01)

(52) U.S. Cl.
CPC .............. *G06F 1/26* (2013.01); *H02M 3/155* (2013.01); *H02M 3/157* (2013.01)

(58) Field of Classification Search
USPC ........................................................ 713/323
See application file for complete search history.

(56) References Cited

U.S. PATENT DOCUMENTS

| | | |
|---|---|---|
| 2003/0115491 A1 | 6/2003 | Williams, III et al. |
| 2006/0020832 A1 | 1/2006 | Hung et al. |
| 2006/0133181 A1 | 6/2006 | Amano et al. |
| 2006/0174145 A1 | 8/2006 | Chapuis et al. |
| 2007/0143640 A1 | 6/2007 | Simeral et al. |
| 2008/0074373 A1 | 3/2008 | Chapuis et al. |
| 2008/0157539 A1 | 7/2008 | Tani et al. |
| 2009/0167092 A1 | 7/2009 | Ma et al. |
| 2013/0326124 A1 | 12/2013 | Zafarana |
| 2013/0335769 A1* | 12/2013 | Yoshida ................ G06F 3/1296 358/1.14 |
| 2014/0077781 A1* | 3/2014 | Murakami .............. H02M 3/04 323/282 |
| 2014/0380070 A1 | 12/2014 | Hua |
| 2015/0022173 A1 | 1/2015 | Le et al. |
| 2015/0310331 A1* | 10/2015 | Rolston ................. G06N 5/025 700/298 |
| 2016/0048181 A1* | 2/2016 | Rosenzweig ........... G06F 1/206 713/322 |

* cited by examiner

CONFIGURABLE DIGITAL INTERFACE FOR SWITCHING VOLTAGE REGULATORS

RELATED APPLICATIONS

The present application is a continuation of U.S. patent application Ser. No. 14/480,777, filed 9 Sep. 2014. The entire contents of the aforementioned application is incorporated herein by reference.

TECHNICAL FIELD

The present application relates to switching voltage regulators, in particular digital interfaces for switching voltage regulators.

BACKGROUND

Switching voltage regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Power supply requirements for electronic systems are complex, with many different power supply rails generated for different voltage, current and start-up requirements in typical multi-component boards. Point-of-Load (PoL) switching voltage regulators efficiently distribute power, allowing voltage supply generation close to the load. Digital voltage regulators are becoming increasingly popular as POL switching voltage regulators, offering flexibility to implement a diverse set of output requirements, with good performance and a rich set of features. Digital switching voltage regulators are often controlled via a digital host interface. The protocol for the digital host interface is subject to change e.g. by changing functionality, extending the command set or changing the protocol revision. Conventional digital switching voltage regulators typically use a hard-coded RTL (register-transfer level) implementation of the digital host interface. With such hard-coded designs, a full mask re-design is needed to adapt to specification changes. This in turn increases overall system cost and the time required to fabricate (physically produce) the new design.

SUMMARY

According to an embodiment of a high-speed, low-latency configurable digital interface, the configurable digital interface comprises a first hardwired unit, a second hardwired unit and a programmable microcontroller interfaced between the first and second hardwired units. The first hardwired unit is operable to deserialize incoming frames received over the configurable digital interface into commands and data associated with operation of a switching voltage regulator, and serialize outgoing data into new frames for transmission over the configurable digital interface. The second hardwired unit is operable to process the commands included in the incoming frames deserialized by the first hardwired unit, and provide the outgoing data to be serialized into new frames by the first hardwired unit. The programmable microcontroller is operable to change one or more of the commands and data flowing between the first and second hardwired units.

According to an embodiment of a method of modifying operation of a high-speed, low-latency configurable digital interface, the method comprises: deserializing incoming frames received over the configurable digital interface by a first hardwired unit into commands and data associated with operation of a switching voltage regulator; processing the commands included in the incoming deserialized frames by a second hardwired unit; and changing one or more of the commands and data flowing between the first and second hardwired units by a programmable microcontroller interfaced between the first and second hardwired units.

According to an embodiment of a switching voltage regulator, the voltage regulator comprises a power stage operable to drive a load, a digital controller operable to control switching of the power stage and a high-speed, low-latency configurable digital interface connecting the digital controller to the load. The high-speed, low-latency configurable digital interface comprises a first hardwired unit, a second hardwired unit and a programmable microcontroller interfaced between the first and second hardwired units. The first hardwired unit is operable to deserialize incoming frames received from the load over the configurable digital interface into commands and data associated with operation of the switching voltage regulator, and serialize outgoing data into new frames for transmission over the configurable digital interface to the load. The second hardwired unit is operable to process the commands included in the incoming frames deserialized by the first hardwired unit, and provide the outgoing data to be serialized into new frames by the first hardwired unit. The programmable microcontroller is operable to change one or more of the commands and data flowing between the first and second hardwired units.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a configurable digital interface for switching voltage regulators. For example, a ROM (read-only memory), NVM (non-volatile memory), or OTP (one-time programmable) memory can be used to aid in reconfiguring the functionality of the digital interface e.g. by adapting the interface command set and/or functionality to new and/or revised specifications. A microcontroller-based architecture can be used to implement complex functionality of the digital interface, so that the desired interface behavior can be stored e.g. in ROM, NVM, OTP, etc. while the actual command and signal processing operations are carried out by dedicated logic circuitry in the digital controller. Such an approach simplifies the process of reconfiguring the digital interface behavior, which can be accomplished by application engineers, field personnel, etc.

Figure 1:
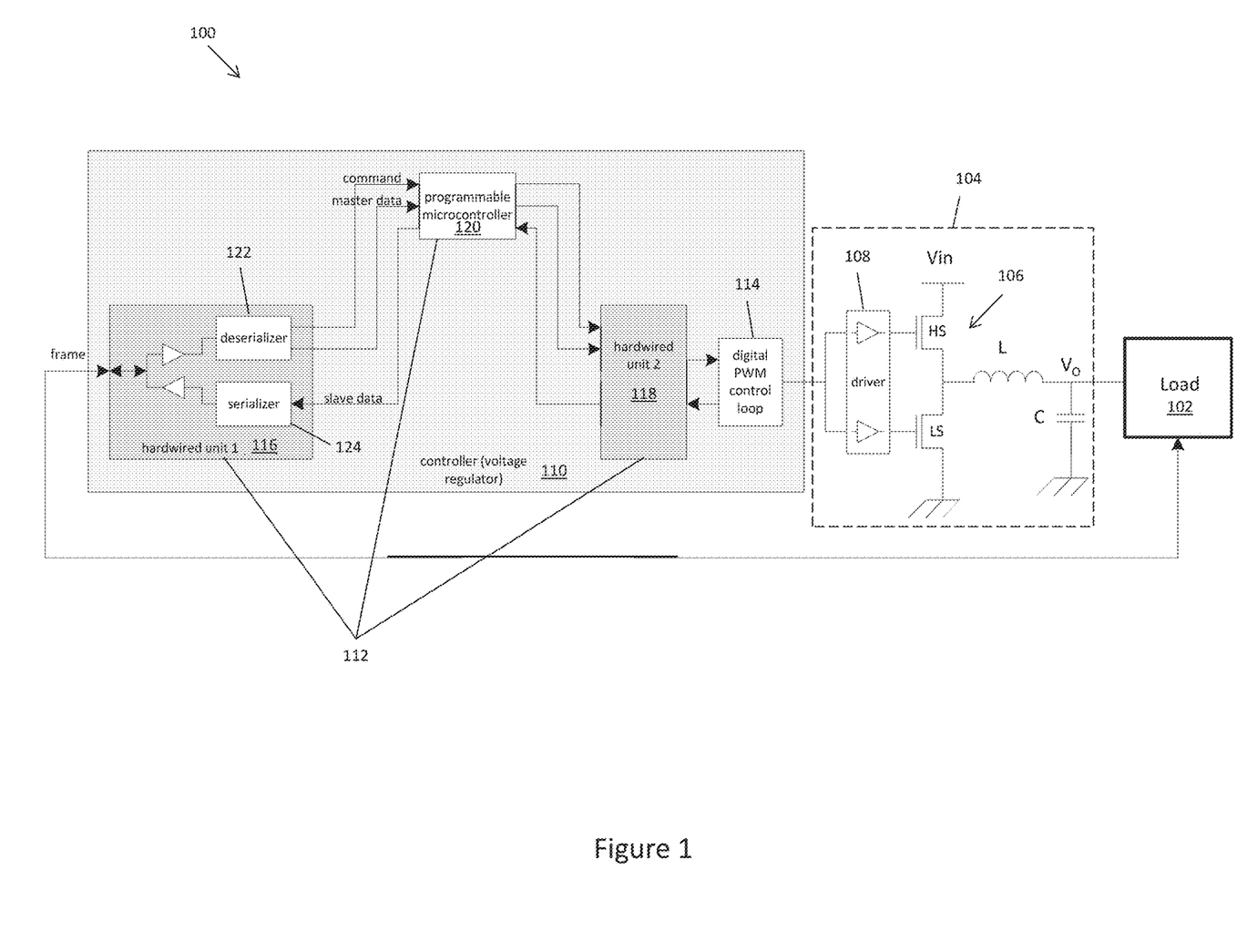
FIG. 1 illustrates a block diagram of an embodiment of an electronic system that includes a load, a switching voltage regulator for regulating the load voltage and a configurable digital interface connecting the load to the regulator.

FIG. 1 illustrates an embodiment of an electronic system 100 that includes a load 102 and a switching voltage regulator 104 for regulating the load voltage. The load 102 can be a high-performance integrated circuit such as a microprocessor, graphics processor, network processor, etc. or other type of integrated circuit requiring voltage regulation such as a POL (point-of-load). The switching voltage regulator 104 comprises a power stage 106 for driving the load 102. The power stage 106 includes a high-side transistor (HS) and a low-side transistor (LS) for coupling to the load 102 through an inductor (L) and capacitor (C). The switching voltage regulator 104 also includes a driver 108 for independently driving the high side and low side transistors. The high-side transistor switchably connects the load 102 to an input voltage (Vin) of the switching voltage regulator 104, and the low-side transistor switchably connects the load 102 to ground at different periods. One power stage 106 is shown in FIG. 1 for ease of illustration. In general, the switching voltage regulator 104 can include any number of power stages 106 including a single power stage (phase) or more than one power stage (i.e. multi-phase where each power stage is one phase of the multi-phase regulator).

The electronic system 100 further comprises a digital controller 110 for controlling switching of the power stage 106 and a high-speed, low-latency configurable digital interface 112 for connecting the digital controller 110 to the load 102. The term "high-speed, low-latency" as used herein means that the load 102 requires the configurable digital interface 112 to respond relatively quickly (e.g. in a few clock cycles) at a relatively high clock frequency. For example, the load 102 may require the configurable digital interface 112 to respond after 1-10 clock cycles at a clock frequency above 10 MHz. The controller 110 can regulate the voltage ($V_O$) delivered to the load 102 by the power stage(s) 106, by adjusting the phase currents delivered to the load 102. The controller 110 can also include a digital PWM (pulse width modulation) control loop 114 for switching each power stage 106 via the corresponding driver 108 so that the power stage(s) 106 source or sink current to the load 102 through the corresponding inductor and the high-side or low-side transistor.

Serial interfaces provide a mechanism for loads such as microprocessors, GPUs (graphics processing units), and other high performance ASICs (application-specific integrated circuits) to communicate with one or more voltage regulators, allowing control and status monitoring of one or more voltage rails for the purpose of optimizing the system performance. Common high performance interfaces for voltage regulator management include Intel's Serial Voltage Identification (SVID), AMD's SVI (Serial Voltage Interface) and PMBUS Adaptive Voltage Scaling (AVS) Bus.

A common feature of these buses are high speed serial clock rates in excess of 25 MHz to support low latency and high throughput, static and dynamic control of the operating voltage, optimized voltage transitions, multiple power states or modes of operations, support for multiple rails, command handshaking to ensure robust operation, and a wide range of telemetry, status, and alert signals and registers to monitor and optimize the power system operation subject to thermal, power dissipation, input power, or other restraints The configurable digital interface 112 can be implemented as a serial interface. The configurable digital interface 112 can be separate from or integrated as part of the digital controller 110 e.g. in the case of a programmable firmware-based microcontroller design. In either case, the configurable digital interface 112 includes a first hardwired unit 116, a second hardwired unit 118 and a programmable microcontroller 120 interfaced between the first and second hardwired units 116, 118. The first hardwired unit 116 includes a deserializer 122 for deserializing incoming frames received from the load 102 over the configurable digital interface 112 into parallel commands and payload data ('command' and 'master data', respectively, in FIG. 1) associated with operation of the switching voltage regulator 104. The first hardwired unit 116 also includes a serializer 124 for serializing outgoing parallel data into new frames for transmission over the configurable digital interface 112 to the load 102. The second hardwired unit 118 processes the parallel commands and payload data deserialized by the first hardwired unit 116. The second hardwired unit 118 also provides outgoing parallel payload data ('slave data' in FIG. 1) to be serialized into new frames by the first hardwired unit 116. The programmable microcontroller 120 changes one or more of the parallel commands and data flowing between the first and second hardwired units 116, 118. The term 'change' as used herein means to modify, replace, block, or alter the form, nature, content, future course, execution, etc. of something. The term 'hardwired' as used herein means implemented in the form of permanent electronic circuitry.

In some embodiments, the regulated load 102 is a CPU (central processing unit) regulated by the switching voltage regulator 104. The configurable digital interface 112 can differentiate between different commands and/or payload data sent from the CPU 102 to the regulator 104 e.g. in a master-slave configuration. As a result, the configurable digital interface 112 can pass a received command/data to an actuator for the switching voltage regulator 104 such as the PWM control loop 114, or modify the command/data before sending it to the actuator for processing. Such a configurable digital interface implementation allows for command modification, payload data modification, blocking of commands, altered execution of commands, changed reject/ACK(acknowledged)/No-ACK(not-acknowledged) behavior, modified data write and data read-back, injection of alerts into the processing flow, logging of commands and signals, etc. The controller 110 can modify the behavior of the configurable digital interface 112 in real-time. For example, status information can be provided from the load 102 which is used by the controller 110 to synchronize configuration changes for incoming digital commands. Also, the configurable digital interface 112 can provide interrupts to synchronize configuration changes with incoming digital commands (dynamic configuration changes). This way, the configurable digital interface 112 can be programmed to optimize transient behavior, improve error handling, improve telemetry readings, provide debugging and analysis, log commands and signals, etc.

Figure 2:
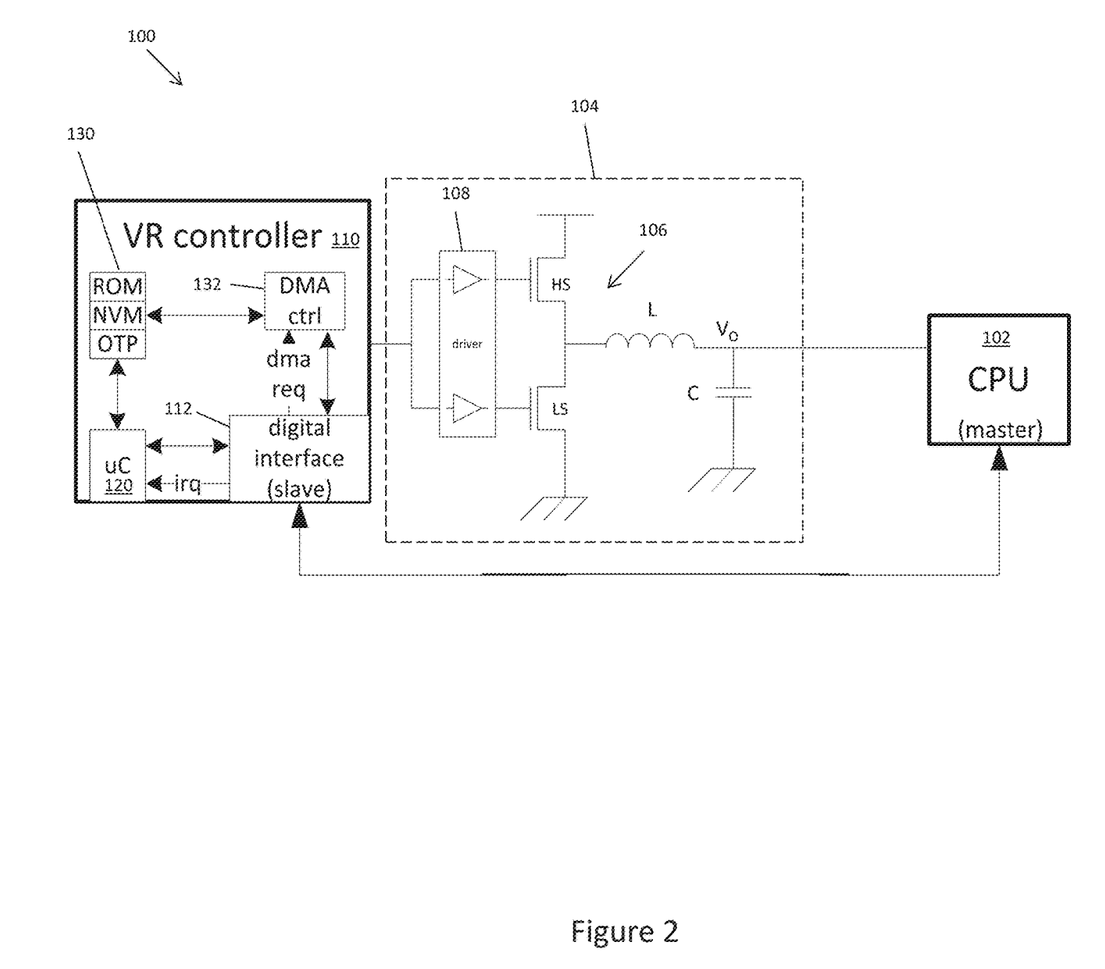
FIG. 2 illustrates a block diagram of another embodiment of an electronic system that includes a load, a switching voltage regulator for regulating the load voltage and a configurable digital interface connecting the load to the regulator.

FIG. 2 illustrates one implementation of the electronic system 100 where the load 102 is a CPU regulated by the switching voltage regulator 104, according to an embodiment. The CPU 102 communicates with the switching voltage regulator 104 via the configurable digital interface 112 in a master-slave configuration, in which the CPU 102 has bidirectional control over the voltage regulator 104. The programmable part of the configurable digital interface 112 is implemented in a ROM, NVM or OTP memory 130 according to this embodiment. The configurable digital interface 112 passes parallel commands and payload data to the programmable microcontroller 120 for processing e.g. based on an interrupt (irq) signaling mechanism. Access to the ROM/NVM/OTP memory 130 is controlled e.g. by a DMA (direct memory access) controller 132 which can handle address decoding for registers, interrupt masking, DMA masking, etc. The configurable digital interface 112 sends DMA requests to the DMA controller 132 for accessing content of the ROM/NVM/OTP memory 130. The content of the ROM/NVM/OTP memory 130 can be re-programmed to reconfigure the functionality of the configurable digital interface 112 e.g. by adapting the interface command set and/or functionality to new and/or revised specifications.

Figure 3:
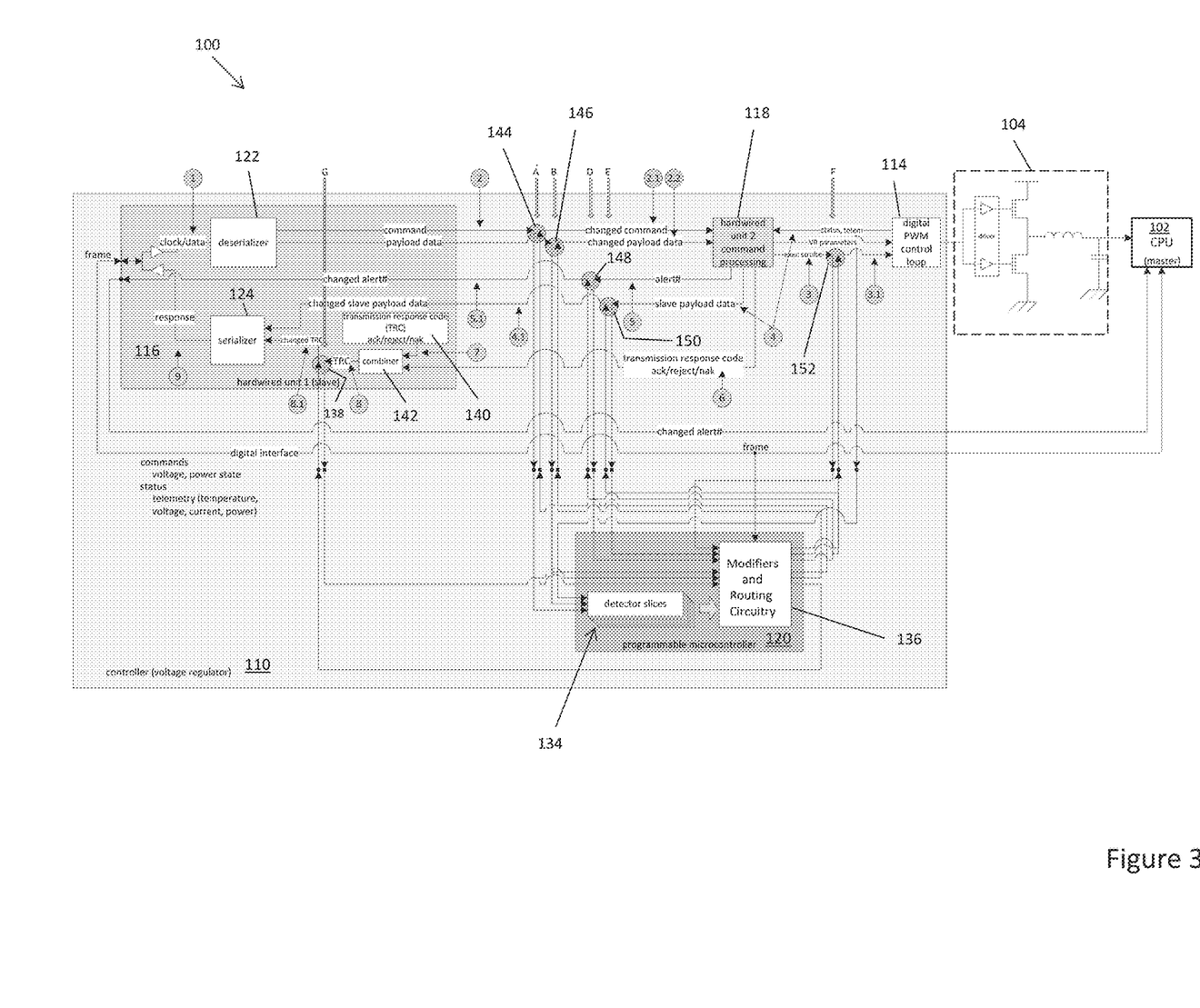
FIG. 3 illustrates a block diagram of yet another embodiment of an electronic system that includes a load, a switching voltage regulator for regulating the load voltage and a configurable digital interface connecting the load to the regulator.

FIG. 3 illustrates an implementation embodiment of the configurable digital interface 112. According to this embodiment, the first hardwired unit 116 of the configurable digital interface 112 implements the link layer i.e. the layer that enables communication between the CPU load 102 and the switching voltage regulator 104 and the second hardwired unit 118 of the configurable digital interface 112 implements the functional layer i.e. the layer that executes and responds to commands from the CPU load 102. The programmable microcontroller 120 interfaces with the link layer and functional layer hardware of the configurable digital interface 112 using intercept points (also referred to herein as hooks).

Various intercept points are show in FIG. 3. Intercept point 'A' is placed on the parallel master command path ('command') between the link and functional layers, to aid in detection and modification of received commands. Intercept point 'B' is placed on the parallel master payload path ('payload data') between the link and functional layers, to aid in detection and modification of the payload data. Intercept point 'D' is placed on the slave alert feed-back signal path ('alert #') between the functional layer and the CPU load 102, to aid in modification of the alert signaling implemented by the switching voltage regulator 104 (e.g. to force de-assertion or inject assertion). Intercept point 'E' is placed on the parallel slave payload path ('slave payload data') between the functional and link layers, to aid in modification of the slave payload data. Intercept point 'F' is placed on the execution strobe path ('exec strobe') between the functional layer and the corresponding regulator actuator, to aid in modification of the actuator execution (e.g. block or force execution). Intercept point 'G' is placed on the parallel slave ACK response path ('TRC/changed TRC') inside the link layer and before the serializer 124, to aid in modification of the ACK response.

Further according to the embodiment illustrated in FIG. 3, the programmable microcontroller 120 is implemented as a plurality of arrangements of combinatorial logic 134 also referred to herein as detector slices. Each detector slice 134 is configured or designed to identify one type of command or one type of payload data flowing between the first and second hardwired units 116, 118, or one type of status flowing between the second hardwired unit 118 and the switching voltage regulator 104. The programmable microcontroller 120 also comprises a plurality of logic circuits (also referred to herein as modifiers) and routing circuitry (also referred to herein as deslicers) 136. Each logic circuit is operable or designed to change the command type or payload data type identified by one of the arrangements of combinatorial logic 134. The routing circuitry is operable or designed to connect each detector slice 134 to the corresponding modifier that changes the command type or data type identified by that detector slice 134.

With such a configuration, the programmable microcontroller 120 can detect command, payload data and status information sent to the switching voltage regulator 104 from the load 102. The programmable microcontroller 120 can also process commands and payload data received from the load 102, generate alert notifications, generate command response messages (ACK/no-ACK/reject), and modify the commands and/or payload data. The detector slices 134, modifiers and routing circuitry 136 enable the microcontroller 120 to change one or more of the commands and payload data flowing between the first and second hardwired units 116, 118 of the configurable digital interface 112, and between the second hardwired unit 118 and the switching voltage regulator 104.

For example in one embodiment, the second hardwired unit 118 provides a transmission response code (TRC) via the path labeled '6' in FIG. 3. The TRC indicates whether a command processed by the second hardwired unit 118 is acknowledged, not-acknowledged or rejected. The term 'acknowledged' as used herein means the proper slave response code to the master in case of a valid command that the slave is expected to execute. The term 'not-acknowledged' as used herein means the proper slave response code to the master in case of an invalid broadcast command, or transmission errors (e.g. parity errors, illegal frame structure, etc.). The term 'reject' as used herein means the proper slave response code to the master in case of a valid command that the slave is expected to not execute.

The serializer 124 of the first hardwired unit 116 serializes the TRC from the second hardwired unit 118 into a new frame for transmission over the configurable digital interface 112 via the path labeled '9' in FIG. 3. The TRC represents the response of the switching voltage regulator 104 to a command previously issued by the CPU load 102. The first hardwired unit 116 of the configurable digital interface 112 can include a switch 138 for providing the TRC to the programmable microcontroller 120 before transmitting the TRC to the CPU load 102. The corresponding detector slice 134 of the microcontroller 120 can identify the TRC. The corresponding modifier 136 changes the TRC so that the TRC serialized into a new frame by the first hardwired unit 116 is different ('changed TRC' in FIG. 3) than the TRC provided by the second hardwired unit 118. In one embodiment, the modifier 136 changes the TRC from acknowledged to rejected if the corresponding command cannot be executed by the controller 110 within the required time period.

The first hardwired unit 116 of the configurable digital interface 112 can also include logic 140 for generating a TRC independent of the second hardwired unit 118. This way, the first and second hardwired units 116, 118 of the configurable digital interface 112 are each operable to independently generate a TRC that indicates whether a particular command is to be acknowledged, not-acknowledged or rejected. According to this embodiment, the first hardwired unit 116 also includes combiner logic 142 for combining the independently generated TRCs into a parallel transmission response code ('TRC' in FIG. 3) via the paths labeled '7', '8' and '8.1' in FIG. 3. The programmable microcontroller 120 can alter the parallel TRC prior to serialization by the first hardwired unit 116 e.g. via the switch mechanism 138 previously described herein. TRC modification is just one of many examples of the types of modifications which can be made via the configurable digital interface 112 via additional switch mechanisms 144, 146, 148, 150, 152.

Figure 4:
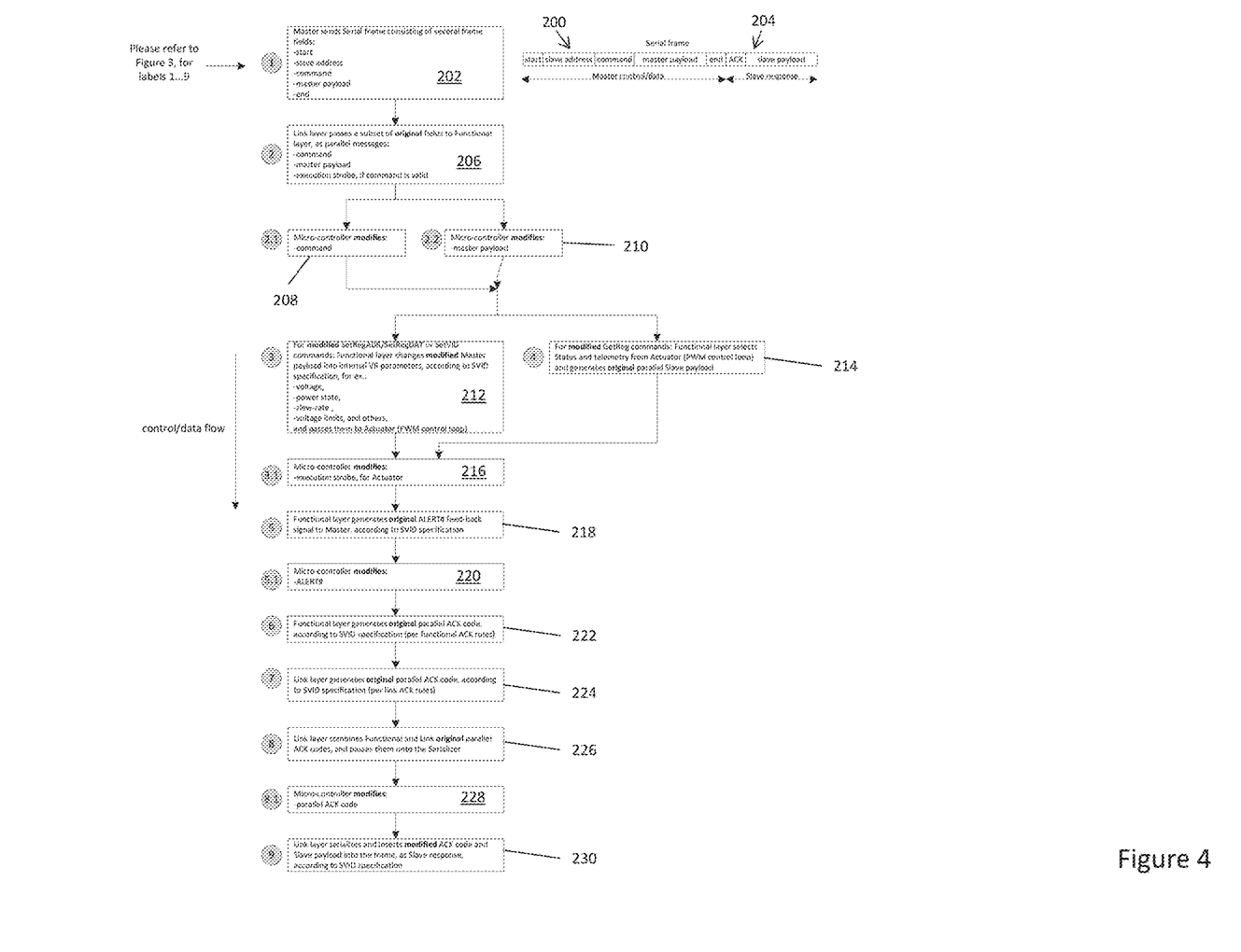
FIG. 4 illustrates a flow diagram of an embodiment of the operation of the configurable digital interface shown in FIGS. 1-3 in response to an incoming command from the load.

FIG. 4 illustrates the general operation of the configurable digital interface 112 in response to an incoming frame 200, according to an embodiment. The paths within the configurable digital interface 112 and regulator controller 110 involved in the frame processing are numbered '1', '2', etc. in FIG. 3. The corresponding paths are identified in the corresponding flow diagram of FIG. 4 for completeness and ease of reference. The first hardwired unit 116 of the configurable digital interface 112 receives the incoming frame (Block 202, path '1'). The incoming frame 200 can include a start field ('start') signaling the beginning of the frame 200, a slave address field ('slave address') for identifying the target switching voltage regulator 104 in the case of a multi-regulator system 100, a command field ('command') for containing the command to be carried out by the target switching voltage regulator 104, a payload field ('master payload') for containing any related data, and an end field ('end') signaling the end of the frame 200. The subsequent response frame 204 generated by the controller 110 of the target switching voltage regulator 104 can include an acknowledge field ('ACK') and a payload field ('slave payload') for containing data related to the processing of the command by the target switching voltage regulator 104.

The first hardwired unit 116, referred to as 'link layer' in FIG. 4, deserializes the frame 200 and passes a subset of the original fields to the second hardwired unit 118, referred to as 'functional layer' in FIG. 4, as parallel messages (Block 206, path '2'). This can include command, payload data and execution strobe messages (if the command is determined to be valid). The programmable microcontroller 120 can modify the command (Block 208, path '2.1') and/or payload data (Block 210, path '2.2') extracted from the received incoming frame.

For set-type commands provided in the SVID (serial voltage identification) specification such as SetRegADR (command used by the load to write registers), SetRegDAT (command used by the load to write registers), SetVID (command used by the load to set the target load supply voltage at a particular transition or decay rate), etc., the second hardwired unit 118 can change the received payload data into internal voltage regulator (VR) parameters (Block 212, path '3'). Again in the case of the SVID specification, this can include changing the received payload data into a target regulated voltage output, power state, slew rate, voltage and/or current limits, etc. The second hardwired unit 118 passes the internal VR information to an actuator for the switching voltage regulator 104 such as the PWM control loop 114 which can adjust the duty cycle of the power stage 106 based on the VR information received from the second hardwired unit 118. For get-type commands provided in the SVID specification such as GetReg (command used by the load to read interface registers), etc., the second hardwired unit 118 can select a particular status and telemetry for the regulator actuator and generates original parallel payload data reflective of the requested action (Block 214, path '4').

The programmable microcontroller 120 can also modify the execution strobe for the regulator actuator (Block 216, path '3.1'). The second hardwired unit 118 of the configurable digital interface 112 generates an original feed-back signal according to the interface specification being implemented e.g. the ALERT # signal for SVID (Block 218, path '5'), and the microcontroller 120 can modify the original feed-back signal if programmed accordingly (Block 220, path '5.1'). The second hardwired unit 118 can also generate a transmission response code (TRC) according to the interface specification being implemented e.g. ACK signal for SVID (Block 222, path '6'), and the first hardwired unit 116 can generate a parallel TRC (Block 224, path '7') as previously described herein. The first hardwired unit 116 combines the original parallel TRCs and passes them to the serializer 124 (Block 226, path '8'). The microcontroller 120 can modify the combined parallel TRC (Block 228, path '8.1') also as previously described herein. The first hardwired unit 116 then serializes and inserts the modified TRC (e.g. ACK for SVID specification) and related payload data into a new frame 204 as the regulator response to the command previously issued by the load 102 and executed by the regulator controller 110 (Block 230, path '9').

Figure 5:
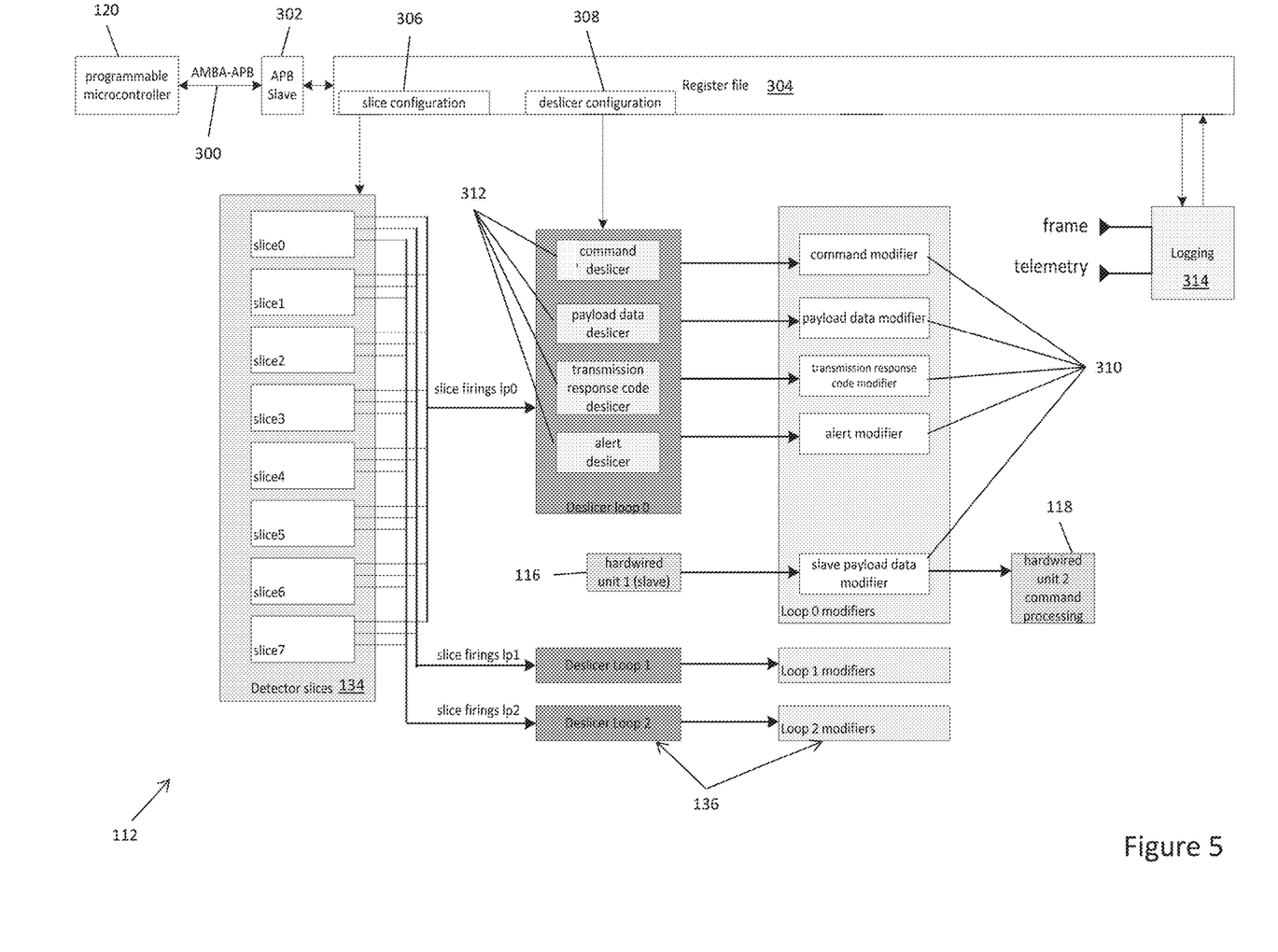
FIG. 5 illustrates a block diagram of an embodiment of the configurable digital interface shown in FIGS. 1-3.

FIG. 5 shows the configurable digital interface 112 in more detail, according to an embodiment. The programmable microcontroller 120 can be connected to the register file 304 e.g. by an AMBA/APB (advanced microcontroller bus architecture/advanced peripheral bus) or other type of bus 300 and corresponding bus slave device 302 to access the programmable part of the configurable digital interface 112. The combinatorial logic 134 for detecting command, payload data and status information sent by the load 102 can be grouped or segmented into detector slices. Each detector slice 134 ('sliceN') is programmed to detect a specific command or a range of command(s), payload data, status signal(s), etc. in any logical combination. Eight detector slices 134 are shown in FIG. 5 as an example, but any desired number of detector slices 134 can be used.

The configurable digital interface 112 can include a register file 304. The register file 304 stores various configuration data 306, 308 accessed by the combinatorial logic 134 (detector slices) and logic circuits/routing circuitry 136 (modifiers/deslicers) of the configurable digital interface 112. Slice configuration data 306 determines which command or payload data type should be identified by each of the detector slices 134 and what command or data changes are made by corresponding modifiers 310. For example, the register file 304 can contain configuration information 306 for the detector slices 134 which enables the detector slices 134 to be programmed in a particular way. Upon positive detection, a slice 134 fires i.e. takes action. A 'firing' slice 134 can trigger the modification of a command, payload data, alert signaling, command response message (ACK/no-ACK/reject), strobe execution, interrupt handling, etc.

Positive detection messages (i.e. slice firings) are routed from the detector slices 134 to the corresponding modifiers 310 of the configurable digital interface 112 by blocks called deslicers 312. The register file 304 contains configuration information 308 for the deslicers 312 which determines how each individual deslicer 312 routes a positive detection message from a detector slice 134 to the corresponding modifier 310. The microcontroller 120 can include groups of deslicers 312 ('Loop 1', 'Loop 2', 'Loop 3' in FIG. 5) to enable parallel processing and reduced latency.

Each modifier 310 of the configurable digital interface 112 is programmed to process a particular type of command or commands, payload data, alert signaling, transmission response code (ACK/no-ACK/reject), execution strobe, interrupt handling, etc. in a specific way. In one embodiment, one of the modifiers 310 ('command modifier') is programmed to modify, block or alter execution of one or more of the commands deserialized by the first hardwired unit 116. Another modifier 310 ('payload data modifier') can be programmed to modify payload data deserialized by the first hardwired unit 116. Yet another modifier 310 ('transmission response code modifier') can be programmed to modify and/or generate a parallel transmission response code (TRC). Still another modifier 310 ('alert modifier') can be programmed to modify the alert signaling implemented by the regulator controller 110. An additional modifier 310 ('slave payload data modifier') can be programmed to modify the original payload data generated by the controller 110 e.g. such as telemetry data. The detector slices 134 and modifiers 310 can be reprogrammed as desired to change the way in which commands, payload data, alert signaling, command response message (ACK/no-ACK/reject), strobe execution, interrupt handling, etc. are detected and processed.

The number of detector slices 134, deslicers 312 and modifiers 310 is scalable, but preferably fixed, in a particular implementation. This limits the number of command, payload data and status signal combinations that can be detected and modified, at a particular instant of time. Logging logic 314 can log pre-modification and post-modification data such as frame and/or telemetry data using the 'hooks' A, . . ., G previously described herein, enabling the configurable digital interface 112 to analyze all frames, and because the configurable digital interface specification allows certain command sequences, the microcontroller 120 can predict what the next frame will be, and can reprogram one or more of the detector slices 134 before the next frame arrives. For example, consider the following sequence for the SVID specification. If the switching voltage regulator controller 110 rejects a command, while the load 102 expects an ACK response, then the load 102 will resend the command one or more times until the controller 110 sends an ACK message. The microcontroller 120 of the configurable digital interface 112 can expand the response time window afforded the regulator controller 110 to respond. Such dynamic slice programming enables the detection and modification of a virtually unlimited number of command/payload/status combinations.

Figure 6:
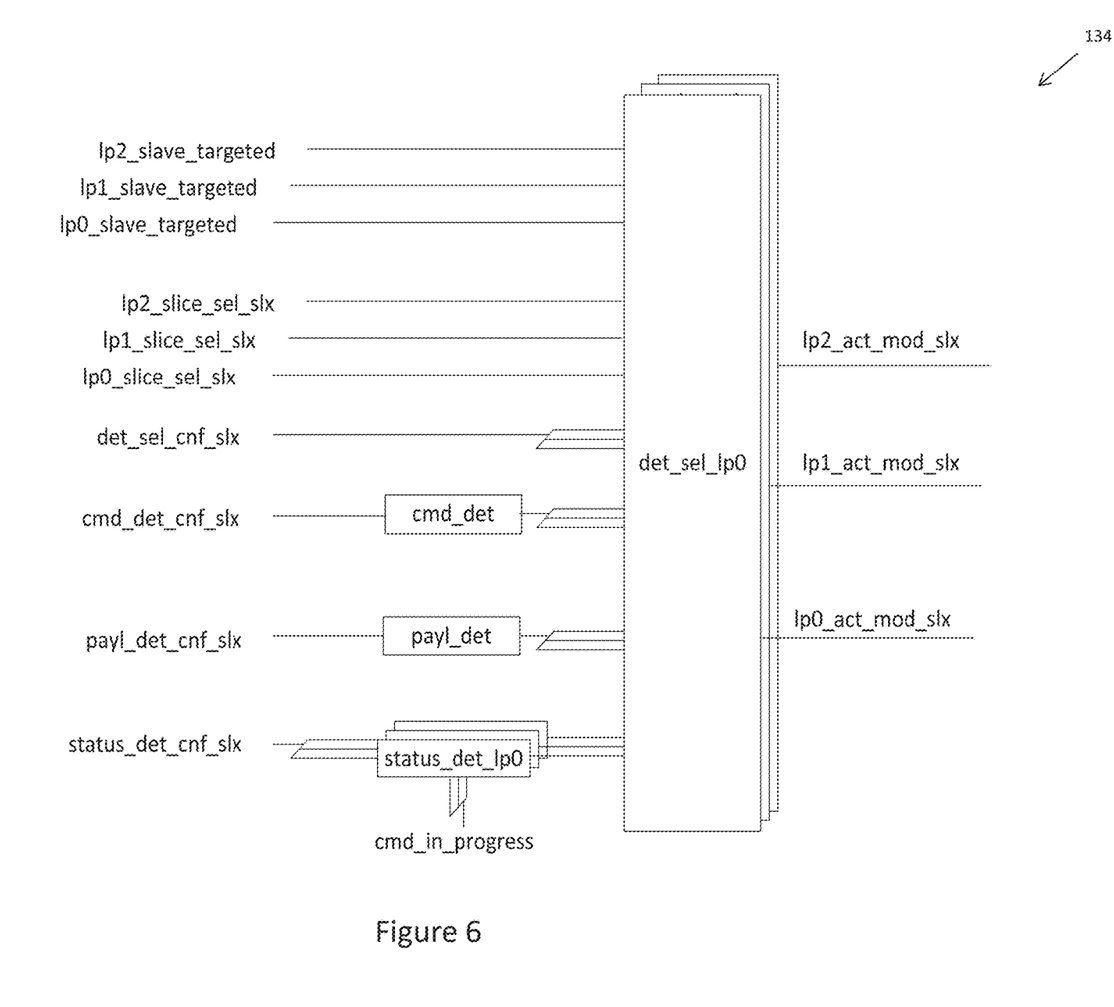
FIG. 6 illustrates a block diagram of an embodiment of combinatorial logic included in the configurable digital interface shown in FIGS. 1-3 and 5.

FIG. 6 illustrates one embodiment of a detector slice 134 for three different loops (groups). The detector slice 134 can be implemented in combinatorial logic and includes a command detector (cmd_det), a payload data detector (payl_det), a status detector (status_det_Ip0) for each loop, and a detection selector (det_sel_Ip0) for each loop. The command detector (cmd_det) detects a particular type of command (cmd_et_cnf_slx), and the payload data detector (payl_det) detects a particular type of payload data (payl_det_cnf_slx). The per-loop status detector (status_det_Ip0) detects a particular combination of status conditions internal to regulator controller 110. The per-loop status detector (status_det_Ip0) operation is blocked while a command execution is in progress (cmd_in_progress). The detection selector (det_sel_Ip0) determines based on an opcode (det_sel_cnf_slX) whether the detector slice 134 should take action based on which switching voltage regulator 104 is targeted (IpX_slave_targeted) by the load 102, which loop is involved (IpX_slice_sel_slx) and which logical combination of type of command (cmd_det), payload (payl_det) and/or status (status_det_IpX) was detected. The output (IpX_act_mod_slx) of the detector slice 134 is a 'firing' signal per loop which indicates whether a certain condition was detected by the detector slice 134 for that loop. Each detector slice 134 can be assigned to any loop via the corresponding loop select signal (Ipx_slice_select_slx), and each detector slice 134 can be assigned to a single loop or more than one loop.

Figure 7A:
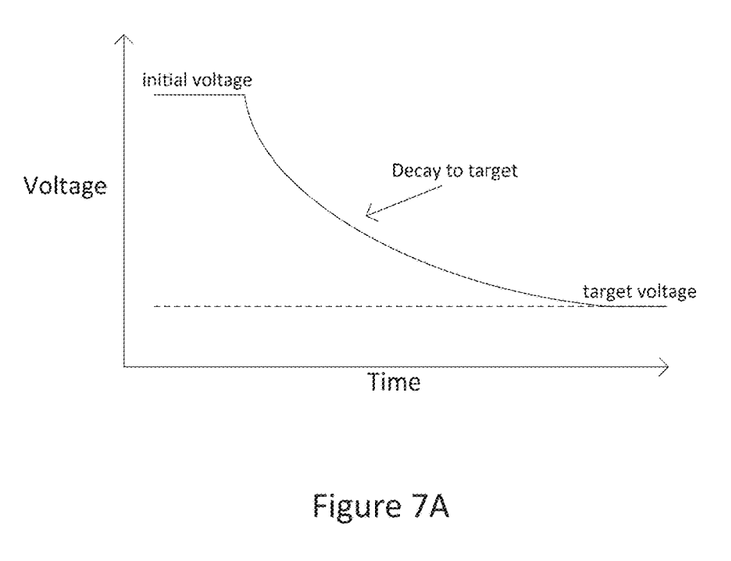
FIGS. 7A and 7B illustrate voltage regulator output waveforms pre and post command modification.
Figure 7B:
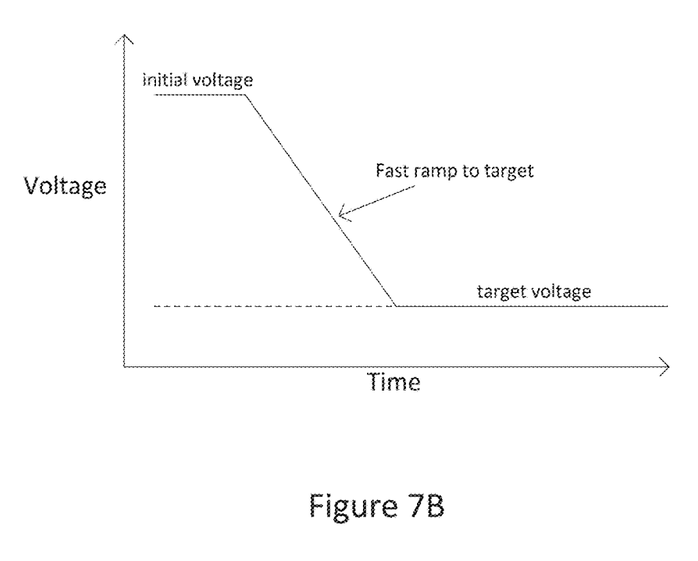

FIG. 7, which includes FIGS. 7A and 7B, illustrates one embodiment of a command modification implemented by the configurable digital interface 112. FIG. 7A shows the expected Vout behaviour for a voltage change (e.g. a SetVID_decay command in the case of the SVID specification) issued by the load 102. The voltage change indicates the desired target voltage of the switching voltage regulator 104. In this example, the initial voltage of the regulator 104 should gradually decay to a target voltage e.g. by placing the high-side and low-side transistors (HS, LS) of the power stage 106 in a high-Z state. The target voltage represents a new voltage level to be implemented by the switching voltage regulator 104.

The first hardwired unit 116 of the configurable digital interface 112 receives the frame that includes the original voltage change command (path '1' in FIG. 3), and deserializes the frame into a parallel command (path '2' in FIG. 3). The second hardwired unit 118 of the configurable digital interface 112 alters the voltage change command so that the voltage change command implemented at the switching voltage regulator 104 differs from the original voltage change command issued by the load 102. In one embodiment, the modified voltage change command provides for a faster ramp to the target voltage as shown in FIG. 7B. For example, one of the detector slices 134 of the configurable digital interface 112 can identify the original voltage change command and the corresponding deslicer 312 can route the command to the appropriate modifier 310 (hook 'A' in FIG. 3). That modifier 310 can be programmed to alter the original voltage change command by changing the transition rate associated with the voltage change command to provide for a faster (or alternatively slower) ramp to the target voltage (path '2.1' in FIG. 3). In another example, the modifier 310 can be programmed to alter the voltage change command by changing the original target voltage level to a lower or higher level than initially requested by the load 102 via the original voltage change command (path '2.1' in FIG. 3).

The command modification embodiment shown in FIG. 7 is intended as a purely illustrative example showing the programmable and flexible nature of the configurable digital interface 112 for the switching voltage regulator 104. As previously described herein, the configurable digital interface 112 can be programmed to modify any desired command type, payload data type, signaling etc. exchanged between the load 102 and the switching voltage regulator 104.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A high-speed, low-latency configurable digital interface for communicating with a load regulated by a switching voltage regulator, the configurable digital interface comprising:
    a first digital hardwired unit operable to deserialize incoming frames received from the load into incoming commands and incoming payload data, the incoming commands and incoming payload data being associated with operation of the switching voltage regulator, and operable to serialize outgoing data into outgoing frames for transmission to the load;
    a second digital hardwired unit operable to receive and process the incoming commands and incoming payload data, and provide the outgoing data to be serialized into outgoing frames by the first digital hardwired unit; and
    a digital programmable microcontroller interfaced between the first and second digital hardwired units and operable to change data transferred between the first and second digital hardwired units based on information received from the load, said data comprising at least one of the incoming commands, the incoming payload data, and the outgoing data.

2. The configurable digital interface of claim 1, wherein the data changed by the digital programmable microcontroller includes one of the incoming commands.

3. The configurable digital interface of claim 1, wherein the data changed by the digital programmable microcontroller includes the incoming payload data.

4. The configurable digital interface of claim 3, wherein the incoming payload data that is changed comprises one or more parameters for the switching voltage regulator.

5. The configurable digital interface of claim 1, wherein the data changed by the digital programmable microcontroller includes the outgoing data.

6. The configurable digital interface of claim 5, wherein the outgoing data provided by the second digital hardwired unit comprises a first transmission response code (TRC) indicating whether a first of the incoming frames processed by the second digital hardwired unit is acknowledged, not acknowledged, or rejected, and wherein the digital programmable microcontroller is operable to change the first TRC so that a modified TRC that differs from the first TRC is serialized by the first digital hardwired unit and transmitted to the load.

7. The configurable digital interface of claim 6, wherein the digital programmable microcontroller is operable to change the first TRC from acknowledged to rejected in response to detecting that a command within the first incoming frame cannot be executed within a required time period.

8. The configurable digital interface of claim 5, wherein the first and second digital hardwired units are each operable to independently generate a transmission response code (TRC) indicating whether a command within a first incoming frame is being acknowledged, not-acknowledged or rejected, wherein the first digital hardwired unit is operable to combine the independently-generated TRCs into a parallel TRC, and wherein the digital programmable microcontroller is operable to alter the parallel TRC prior to serialization by the first digital hardwired unit.

9. The configurable digital interface of claim 5, wherein the outgoing data comprises an alert signal indicating that a change in status has occurred, and related outgoing payload data provided by the second digital hardwired unit for a load regulated by the switching voltage regulator.

10. The configurable digital interface of claim 1, wherein a first of the incoming frames comprises a voltage change command and associated payload data, the voltage change command and associated payload data indicating a target voltage of the switching voltage regulator, and wherein the digital programmable microcontroller is operable to alter the voltage change command or the associated payload data.

11. The configurable digital interface of claim 10, wherein the digital programmable microcontroller is operable to alter a transition rate included in the voltage change command or the associated payload data, the transition rate indicating how quickly the switching voltage regulator must transition from one voltage level to another voltage level.

12. The configurable digital interface of claim 10, wherein the digital programmable microcontroller is operable to alter a voltage level included in the voltage change command or the associated payload data, the voltage level indicating a new voltage level to be implemented by the switching voltage regulator.

13. The configurable digital interface of claim 1, wherein the digital programmable microcontroller is also interfaced between the second digital hardwired unit and the switching voltage regulator and is operable to modify, block or alter the execution of a command provided by the second digital hardwired unit to the switching voltage regulator.

14. The configurable digital interface of claim 1, wherein the digital programmable microcontroller comprises:
    a plurality of arrangements of combinatorial logic, each arrangement of combinatorial logic configured to identify one type of command or one type of data flowing between the first and second digital hardwired units or between the second digital hardwired unit and the switching voltage regulator;
    a plurality of logic circuits, each logic circuit operable to change the command type or data type identified by one of the arrangements of combinatorial logic; and
    circuitry for connecting each arrangement of combinatorial logic to the corresponding logic circuit that changes the command type or data type identified by that arrangement of combinatorial logic.

15. The configurable digital interface of claim 14, wherein the digital programmable microcontroller further comprises register files for storing configuration data accessed by the arrangements of combinatorial logic and the logic circuits, the configuration data determining which command or data or status type is identified by each of the arrangements of combinatorial logic and what command or data changes are made by the logic circuits.

16. A method of modifying operation of a high-speed, low-latency configurable digital interface for communicating with a load regulated by a switching voltage regulator, the method comprising:

deserializing incoming frames, received from the load by a first digital hardwired unit, into incoming commands and incoming payload data associated with operation of the switching voltage regulator;

processing the incoming commands and incoming payload data by a second digital hardwired unit;

serializing, by the first digital hardwired unit, outgoing data into outgoing frames for transmission to the load;

providing, by the second digital hardwired unit, the outgoing data to be serialized into outgoing frames by the first digital hardwired unit;

reconfiguring the behavior of the configurable digital interface based on information received from the load, by changing data transferred between the first and second digital hardwired units, said data comprising at least one of the incoming commands, the incoming payload data and the outgoing data.

17. A switching voltage regulator, comprising:

a power stage operable to drive a load;

a digital controller operable to control switching of the power stage; and a high-speed, low-latency configurable digital interface connecting the digital controller to the load and comprising:

a first digital hardwired unit operable to deserialize incoming frames received from the load into incoming commands and incoming payload data, the incoming commands and incoming payload data being associated with operation of the switching voltage regulator, and serialize outgoing data into outgoing frames for transmission to the load;

a second digital hardwired unit operable to receive and process the incoming commands and incoming payload data, and provide the outgoing data to be serialized into outgoing frames by the first digital hardwired unit; and a digital programmable microcontroller interfaced between the first and second digital hardwired units and operable to change data transferred between the first and second digital hardwired units based on information received from the load, said data comprising at least one of the incoming commands, the incoming payload data, and the outgoing data.

18. The switching voltage regulator of claim 17, wherein the incoming commands and incoming payload data comprise a power state command and related power state payload data which indicate a power state of the power stage, and wherein the digital programmable microcontroller is operable to alter the power state command or the related power state payload data.

19. The switching voltage regulator of claim 17, wherein the digital programmable microcontroller is operable to alter a command execution strobe extracted from an incoming frame by the first digital hardwired unit and intended for the second digital hardwired unit.

* * * * *